Figure 1:
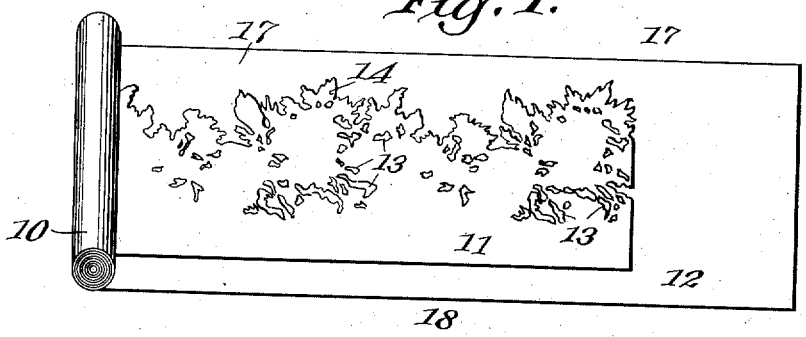

R. B. GRIFFIN.

WALL PAPER.

APPLICATION FILED MAY 15, 1911.

Reissued July 11, 1911.

13,267.

WITNESSES

John J. Ranagan

A. Richards

INVENTOR

R. B. Griffin

BY

Wm. A. Megrath

ATTORNEY

UNITED STATES PATENT OFFICE.

ROBERT B. GRIFFIN, OF NEW YORK, N. Y.

WALL-PAPER.

13,267. Specification of Reissued Letters Patent. Reissued July 11, 1911.

Original No. 986,054, dated March 7, 1911, Serial No. 558,541. Application for reissue filed May 15, 1911. Serial No. 627,376.

*To all whom it may concern:*

Be it known that I, ROBERT B. GRIFFIN, a citizen of the United States, and a resident of the city, county, and State of New York, have invented certain new and useful Improvements in Wall-Paper, of which the following is a specification.

This invention relates to improvements in wall paper and especially to means whereby cut-out decorated friezes, borders, panels and the like may be distributed and handled and paste applied by the paper hanger without danger of tearing or injuring the same.

It has been found that when the cutting out was done at the factory it was impracticable to roll the cut-out friezes for shipment owing to the fact that the irregular edges and the frail cut-out portions became torn and crushed and so marred as to make the same unfit for use. To overcome these objections it has been proposed to perforate the outlines of the decoration, leaving the blanks in place so that the friezes could be rolled and shipped as an ordinary roll of paper. When ready for use the blanks were removed by the paper hanger by tearing out the same on the perforated lines. This has also been found to be objectionable because in removing the blanks the delicate parts of the friezes became torn and in some instances so badly mutilated that they could not be used, to say nothing of the time lost in removing said blanks.

Both the methods referred to were further objectionable because the paper hanger had to apply the paste very carefully and slowly to prevent tearing or removing any of the frail and delicate parts of the decoration by the brush, and even with the greatest care, in many cases the frieze or border could not be used on account of injuries of this character, causing great loss.

The objects of my invention are to remove the said objections and to provide means whereby the cut-out friezes, borders, etc., can be shipped and handled without liability of injury, and so that the paper hanger can apply paste thereto rapidly and without destroying the same, and at great saving of time and expense.

In carrying out the invention the design of the frieze is cut out, preferably by steel dies which insure a smooth edge on the line of cut. In some instances the design is cut only at the prominent outlines of the pattern at the bottom of the frieze, while in other cases the blanks in the body of the pattern may be removed. This produces a frieze, which when applied over and on top of ordinary wall paper has a most pleasing effect, the plain paper itself showing through at the cut-out portions of the frieze, giving the appearance of a free fresco design.

The cut-out frieze is rolled up with a plain strip of paper or other fabric of greater width than the cut-out frieze, with the decorated side thereof next to the plain strip of paper. The plain fabric being wider than the cut-out frieze protects the edges of the frieze and said paper lying between the cut-out frieze in the roll also prevents any portion of said frieze coming in contact with any other portion, and the liability of the frail parts of said frieze becoming interlocked and torn is obviated.

Figure 2:
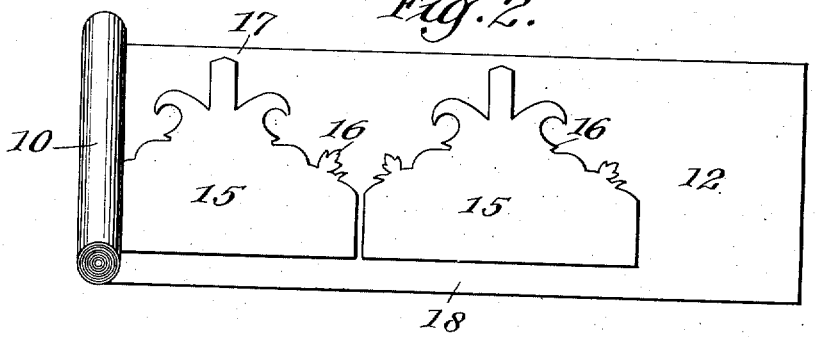
Figure 3:
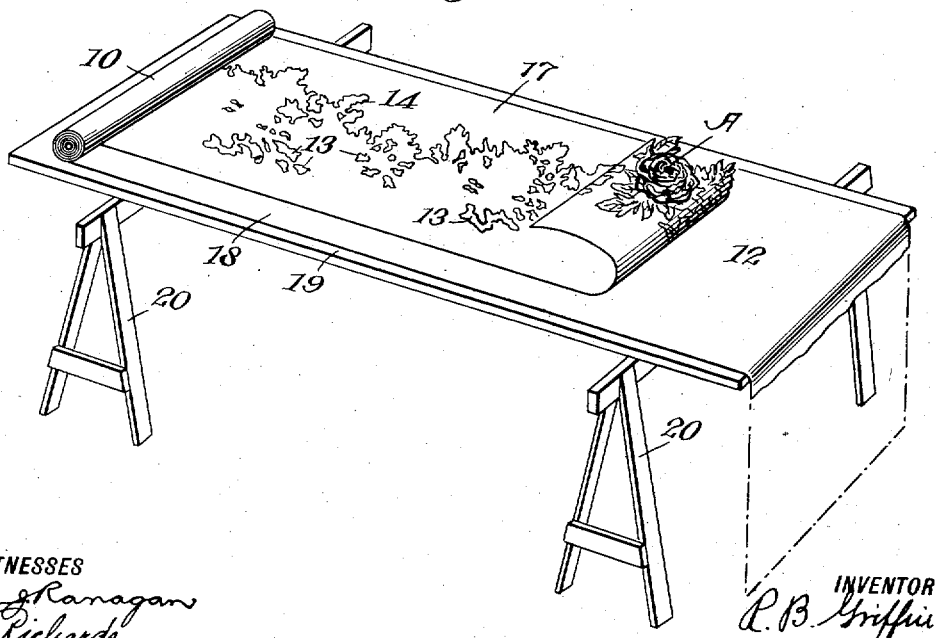

One embodiment of my invention is illustrated in the accompanying drawings, in which:

Figure 1 is a view of a roll with one end unrolled, showing a continuous cut-out frieze, face down on the strip of plain protecting material. Fig. 2 is a similar view with the cut-out frieze in separate pieces or sections. Fig. 3 is a perspective view showing the roll on a paper hanger's table with the end unrolled, with the decorated frieze in position to have paste applied to the plain side thereof.

The part marked 10 on the drawing represents the finished roll.

11 is the cut-out decorated frieze in a continuous strip, with the decorated side A next to the protecting fabric 12. The cut-out in the body of the frieze is marked 13 and the cut-out edges 14.

15 represents another design of decorated cut-out frieze. In this case the design is in sections and only the edges 16 are cut out.

The edges of the protecting fabric 12 project beyond the edges of the decorated frieze at 17 and 18 and when rolled up with the cut-out frieze, said edges prevent the frieze from being injured in transportation.

19 represents an ordinary paper hanger's table resting on legs or trusses 20 on which the roll 10 is laid. The end of a roll is spread out on the table ready for the paper hanger to apply paste thereto, as shown in Fig. 3 of the drawing. The cut-out frieze lying in the position shown on the protecting fabric 12 can have paste quickly and readily applied thereto without liability of tearing or removing any of the delicate parts of the frieze. When paste has been applied to a length of the frieze it is cut off and pasted on the wall in the usual manner. That part of the protecting fabric from which said length of frieze has been removed is torn off and then another length is unrolled and manipulated in the same manner. As such part of the fabric is not used a second time, the frieze always lies on a clean surface when spread out on the table for pasting, and the objections incident to laying it on an unclean and sticky surface are overcome. Not only is the decorated surface of the frieze kept clean by the present invention, but, as the delicate figures of the frieze are not caught and held by a sticky surface, they are not pulled off and out of the frieze when the frieze is removed from the table to be hung. Therefore, the paper hanger does not have to use care when lifting the frieze from the table. The frieze is more easily and quickly manipulated and more of it can be hung in a given time than heretofore.

Having now described my invention, what I claim as new and desire to secure by Letters Patent is:

1. As a new article of manufacture, a cut-out decorated frieze for wall paper, and a strip of protecting fabric wider than said frieze, the two being superimposed and rolled together, the decorated surface of the frieze being next to the inner surface of the said protecting fabric.

2. As a new article of manufacture, a frieze or border of wall paper having an ornamental design and removed portions arranged at various places within the design, a fabric wider than said frieze the edges thereof extending beyond the edges of the frieze, the fabric and frieze being superimposed and rolled together, the ornamental design being next to the inner surface of said fabric.

3. As a new article of manufacture, a roll consisting of a cut-out decorated frieze and a continuous strip of paper, the two being superimposed and the decoration of the frieze being next to the inner surface of the paper, said paper being wider than the frieze and an edge thereof extending beyond an edge of the frieze, the frieze and the fabric being rolled together.

4. As a new article of manufacture, a roll of wall paper consisting of a continuous cut-out decorated frieze and a continuous strip of paper, the frieze being superimposed with the decorated side of the frieze next to the inner surface of the paper, the paper being wider than the frieze and the edges thereof extending beyond the edges of the frieze, said frieze and paper being rolled together.

5. As a new article of manufacture, a roll consisting of a cut-out decorated wall covering and a strip of fabric, the said fabric being wider than the wall covering, the two being superimposed and rolled together with an edge of the fabric extending beyond an edge of the covering, the decorated side of the covering being next to a surface of the fabric so that when unrolled said decorated side of the covering will lie over and be in contact with the fabric.

In witness whereof I have hereunto set my hand at the city, county and State of New York, this 11th day of May, 1911.

ROBERT B. GRIFFIN.

In presence of—
JULIAN S. ISAAC,
ISABEL R. RICHARDS.